(12) United States Patent
Graham (10) Patent No.: US 10,405,694 B2
(45) Date of Patent: Sep. 10, 2019

(54) COOKING VESSEL COVER DEVICE

(71) Applicant: Robert D. Graham, Minneapolis, MN (US)

(72) Inventor: Robert D. Graham, Minneapolis, MN (US)

(73) Assignee: Simply Works, LLC, St. Anthony, MN (US)

(*) Notice: Subject to any disclaimer, the term of this patent is extended or adjusted under 35 U.S.C. 154(b) by 173 days.

(21) Appl. No.: 15/481,352

(22) Filed: Apr. 6, 2017

(65) Prior Publication Data

US 2018/0132656 A1    May 17, 2018

Related U.S. Application Data

(60) Provisional application No. 62/421,230, filed on Nov. 12, 2016.

(51) Int. Cl.
| | |
|---|---|
| *A47J 36/10* | (2006.01) |
| *A47J 36/04* | (2006.01) |
| *A47J 36/12* | (2006.01) |
| *A47J 36/06* | (2006.01) |

(52) U.S. Cl.
CPC ............ *A47J 36/10* (2013.01); *A47J 36/04* (2013.01); *A47J 36/06* (2013.01); *A47J 36/12* (2013.01)

(58) Field of Classification Search
CPC .. A47J 36/10; A47J 36/06; A47J 36/12; A47J 36/04
See application file for complete search history.

(56) References Cited

U.S. PATENT DOCUMENTS

| | | | |
|---|---|---|---|
| 2,504,727 A | 4/1950 | Post | |
| 2,517,648 A | 8/1950 | Franke | |
| 2,736,536 A | 2/1956 | Banowitz | |
| 2,808,175 A * | 10/1957 | Aiken | A47J 36/10 |
| | | | 220/379 |
| 4,549,811 A | 10/1985 | Schiffner et al. | |
| D381,863 S | 8/1997 | Vineis | |
| 6,123,449 A | 9/2000 | Sadek-Patt | |
| D467,464 S | 12/2002 | Sampaio | |

* cited by examiner

*Primary Examiner* — Andrew T Kirsch
*Assistant Examiner* — Don M Anderson
(74) *Attorney, Agent, or Firm* — Patentfile, LLC; Bradley C. Fach; Steven R. Kick (57) ABSTRACT

In some embodiments, a cooking vessel cover device may include a body with a perimeter, upper surface, and lower surface. The body may be made from a flexible material so that portions of the body may flex to allow the device to move between the closed position and the open position. The perimeter and/or portions of the body bounded by the perimeter may contact the upper terminus of a cooking vessel when the device is in a closed position so that the perimeter and the body may be in a generally flat planar orientation. An aperture, which may be configured to receive portions of a food preparation apparatus and which may be disposed within the body, may pass through the upper surface and lower surface, thereby allowing the food preparation apparatus to operate with the cooking vessel cover in the closed position and the open position. A positioning fastener may be coupled to the body which is configured to be removably coupled to one or more objects thereby securing the device in an open position.

11 Claims, 7 Drawing Sheets

COOKING VESSEL COVER DEVICE

CROSS REFERENCE TO RELATED APPLICATIONS

This application claims priority to and the benefit of the filing date of U.S. Provisional Application No. 62/421,230, filed on Nov. 12, 2016, entitled "COOKING VESSEL COVER DEVICE", which is hereby incorporated by reference in its entirety.

FIELD OF THE INVENTION

This patent specification relates to the field of covers and lids for cooking vessels. More specifically, this patent specification relates to a cooking vessel cover device which governs access to the contents of a cooking vessel while allowing the cooking vessel to be used with food preparation apparatuses such as immersion blenders, circulation devices, immersion cookers, and the like.

BACKGROUND

Food preparation activities, such as boiling, simmering, Sous Vide cooking, blending, mixing, and the like, frequently produce splattering and other messes from the food inadvertently exiting food preparation vessels during the activities. Sous Vide cooking is cooking at very controlled temperatures (below boiling) with the food usually paced in a container, most often a bag, and the heating medium is usually water. When Sous Vide cooking, evaporation of the water is the number one concern with long cooking times. As the cooking water evaporates it needs to be replaced. Sous Vide cooking usually takes over one hour and commonly it may be for two or more hours. Additionally, it is not uncommon for cooking times to include four, six, and over twenty-four hours. The constant need to check and maintain water in the cooking vessel can be troublesome. Not enough water can ruin the slow cooking process, while adding replacing water in the cooking vessel can alter the temperature of the water and food in the cooking vessel. It is necessary to efficiently maintaining a less variable temperature within the cooking vessel (heat loss).

While lids and covers for pots, pans, and other cooking vessels are known in the art, they are generally only able to be used to accomplish one type of activity. For example, a lid for a cooking vessel that may be used to prevent splattering during cooking may inhibit the ability of the use of preparation apparatuses such as immersion blenders, circulation devices, immersion cookers, and the like. Conversely, a cover for a food preparation vessel that may be used to prevent splattering during mixing or blending may be unable to withstand heat from cooking.

Therefore a need exists for a novel cooking vessel cover device which governs access to the contents of a cooking vessel while allowing the cooking vessel to be used with food preparation apparatuses. Finally, a need exists for a novel cooking vessel cover device which is configured to prevent evaporation of water during Sous Vide cooking while allowing food preparation apparatuses to be used during the food preparation or cooking process.

BRIEF SUMMARY OF THE INVENTION

A cooking vessel cover device is provided which is configured to function as a lid or cover for a cooking vessel to prevent or reduce evaporation of a Sous Vide cooking medium within the interior of the cooking vessel and thereby reducing the variability of the temperature within the cooking vessel and the food contents of the cooking vessel and optionally to prevent the contents from inadvertently splattering or otherwise exiting the cooking vessel while allowing a food preparation apparatus to operate in the cooking vessel. In some embodiments, the device may include a body with a perimeter, upper surface, and lower surface. The perimeter and/or portions of the body bounded by the perimeter may contact the upper terminus of a cooking vessel when the device is in a closed position so that the perimeter and the body may be in a generally flat planar orientation. An aperture, which may be configured to receive portions of a food preparation apparatus and which may be disposed within the body, may pass through the upper surface and lower surface. A positioning fastener may be coupled to or proximate to the perimeter which is configured to be removably coupled to one or more objects thereby securing the device in an open position.

In further embodiments, the body may be made from a flexible material so that portions of the body may flex out of the flat planar orientation of the closed position and into a curved planar orientation of the open position.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or"

includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
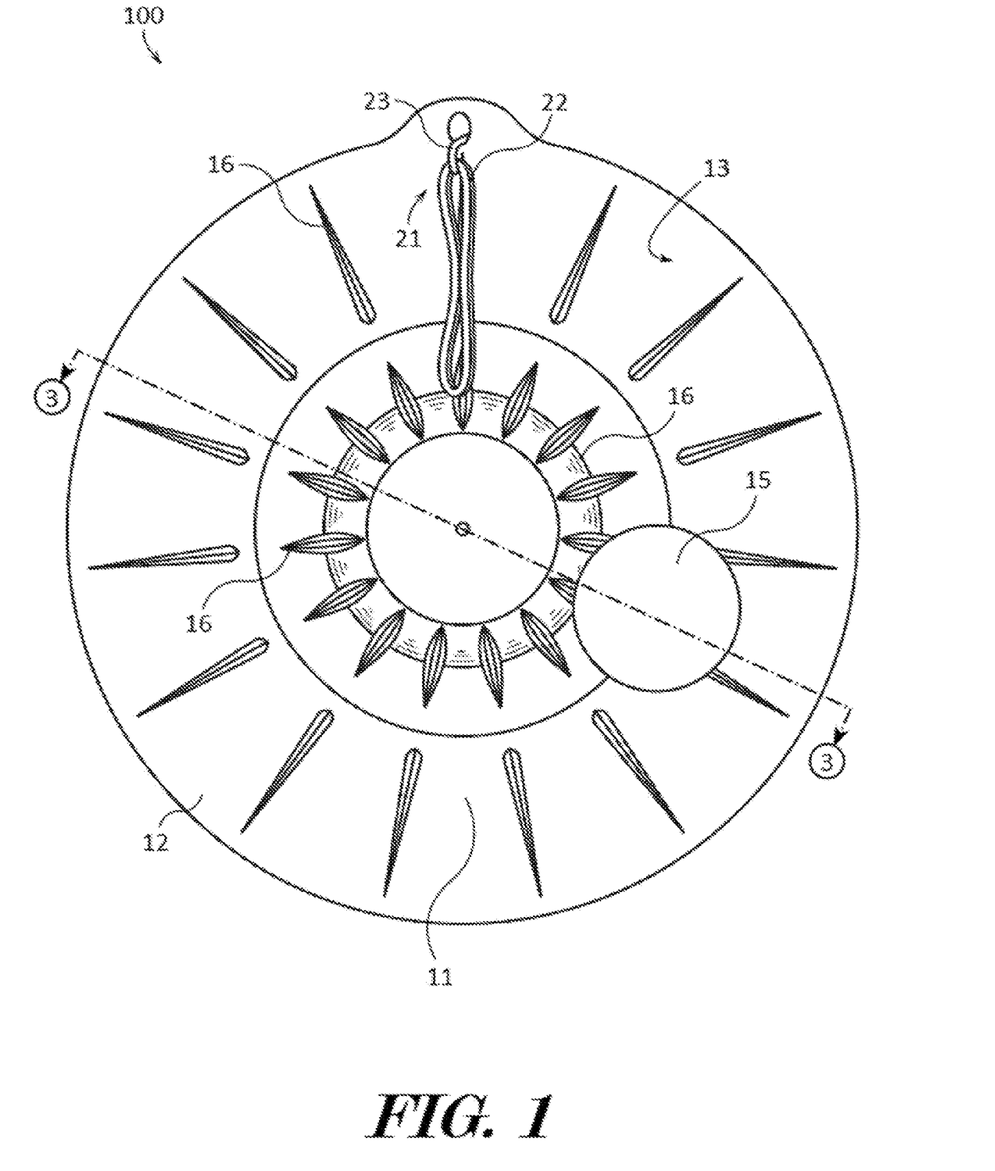
FIG. 1 depicts a top plan view of an example of a cooking vessel cover device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new cover or lid for cooking vessels is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
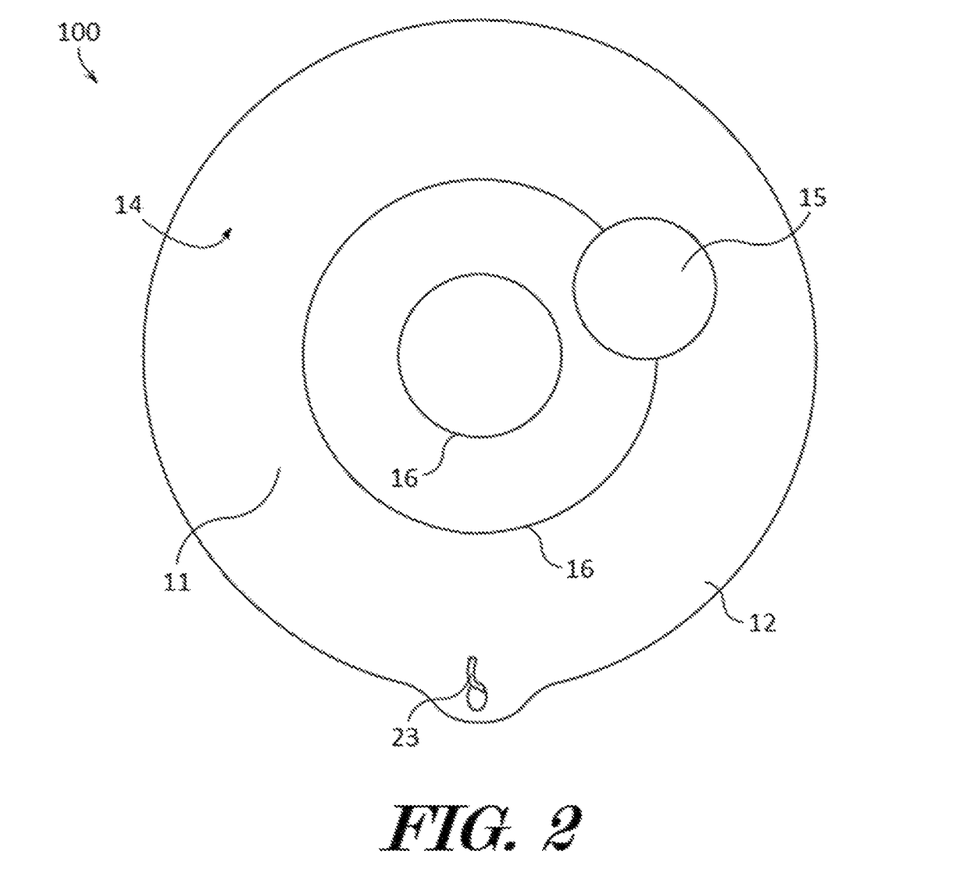
FIG. 2 illustrates a bottom plan view of an example of a cooking vessel cover device according to various embodiments described herein.
Figure 3:
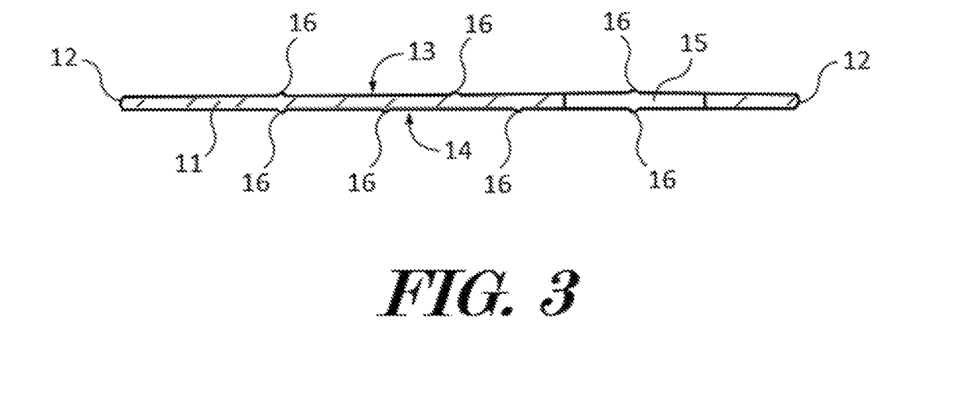
FIG. 3 shows a sectional, through line 3-3 shown in FIG. 1, elevation view of an example of a cooking vessel cover device according to various embodiments described herein.
Figure 7:
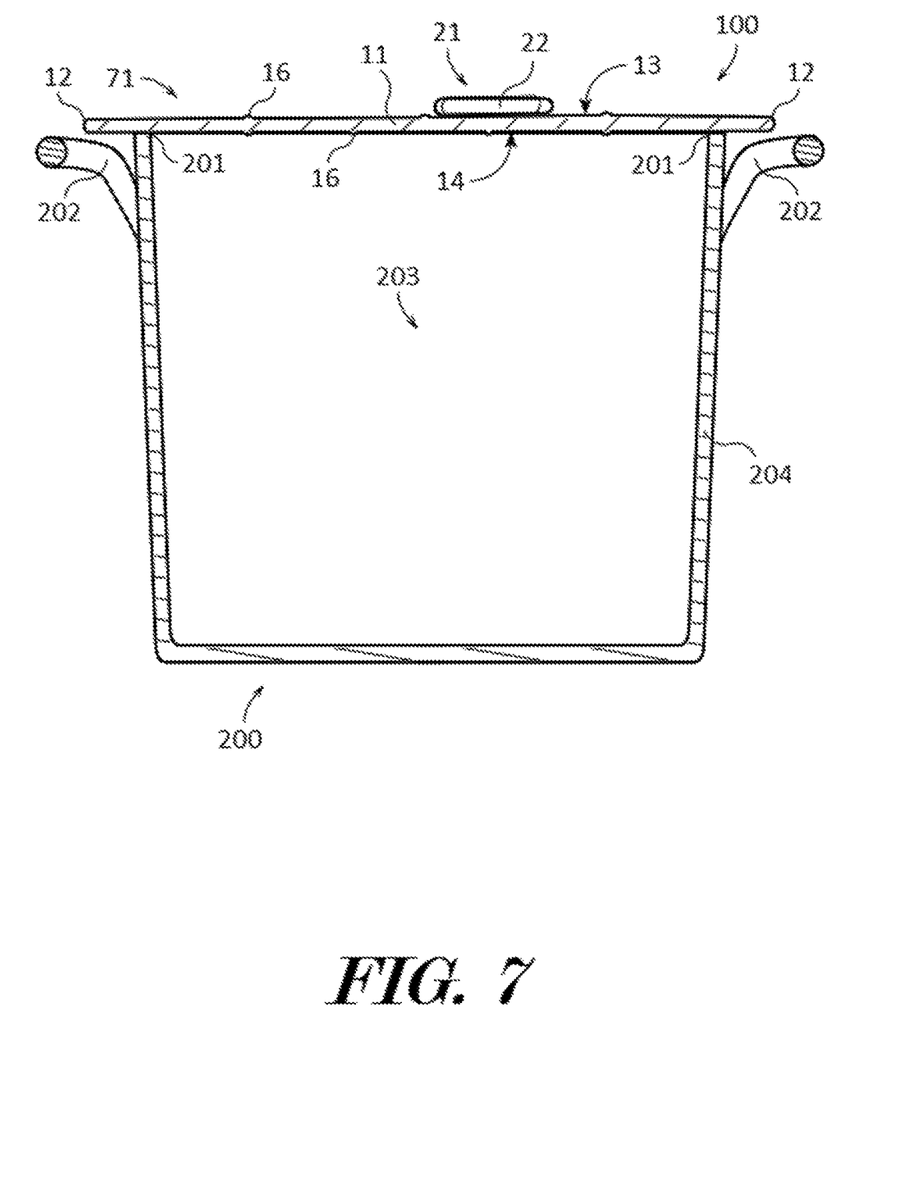
FIG. 7 shows a sectional, through line 7-7 shown in FIG. 4, elevation view of an example of an example of a cooking vessel cover device in a closed position while engaged to a cooking vessel according to various embodiments described herein.
Figure 8:
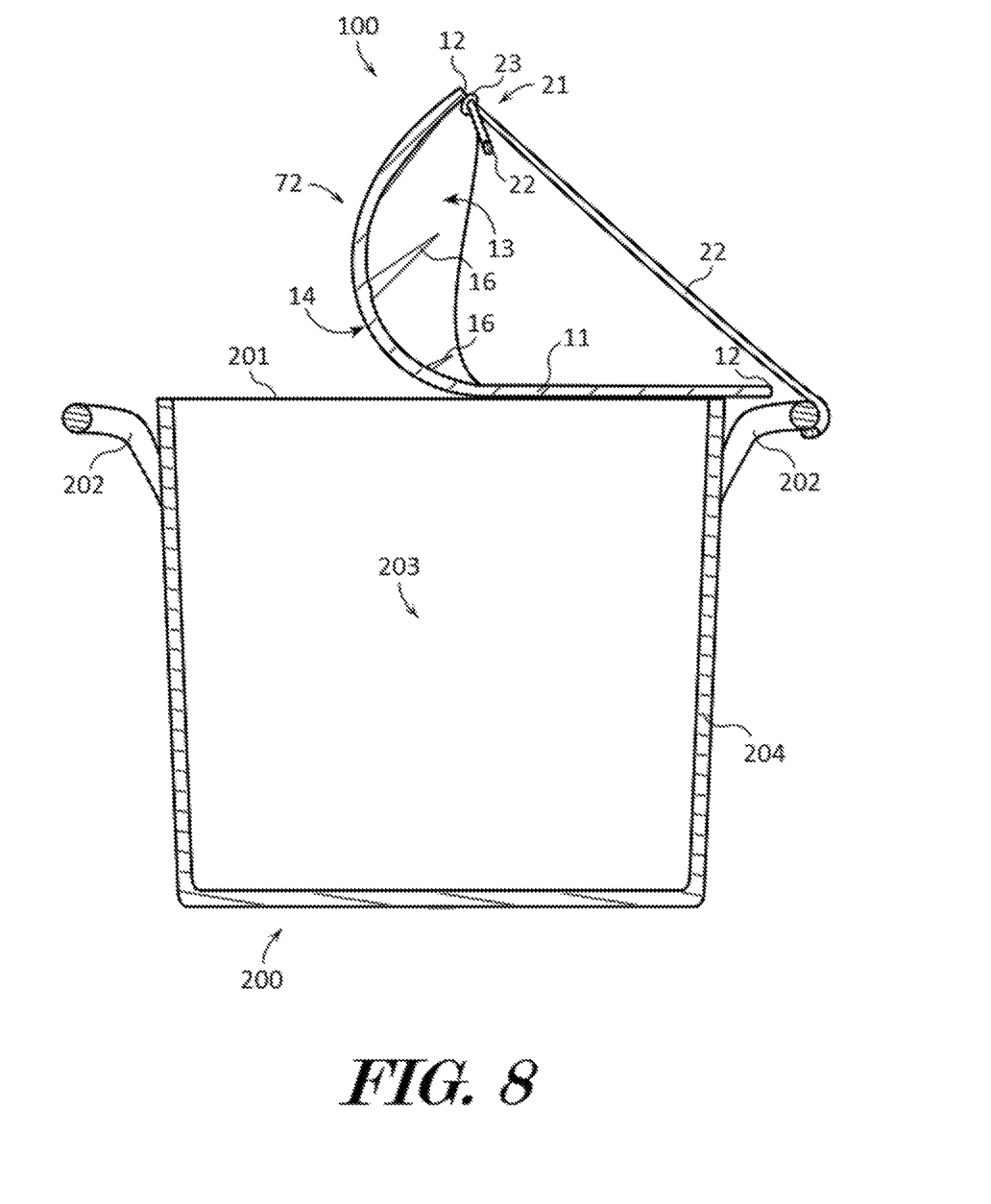
FIG. 8 shows a sectional, through line 8-8 shown in FIG. 6, elevation view of an example of a cooking vessel cover device in an open position while engaged to a cooking vessel.

The present invention will now be described by example and through referencing the appended figures representing preferred and alternative embodiments. FIGS. 1-3 illustrate an example of a cooking vessel cover device ("the device") 100 according to various embodiments. In some embodiments, the device 100 may comprise a body 11 with a perimeter 12, upper surface 13, and lower surface 14. The perimeter 12 and/or portions of the body 11 bounded by the perimeter 12 may contact the upper terminus 201 (FIGS. 5, 6, and 8) of a cooking vessel 200 (FIGS. 4-8) when the device 100 is in a closed position 71 (FIGS. 4 and 7) so that the perimeter 12 and the body 11 may be in a generally flat planar orientation. An aperture 15 configured to receive portions of a food preparation apparatus 301 (FIGS. 4-6) may be disposed within the body 11 which may pass through the upper surface 13 and lower surface 14. A positioning fastener 21 may be coupled to or proximate to the perimeter 12 which is configured to be removably coupled to one or more objects thereby securing the device 100 in an open position 72 (FIGS. 5, 6, and 8). Preferably, the body 11 may be made from a flexible material so that portions of the body 11 may flex out of the flat planar orientation of the closed position and into a curved planar orientation of the open position 72.

Figure 4:
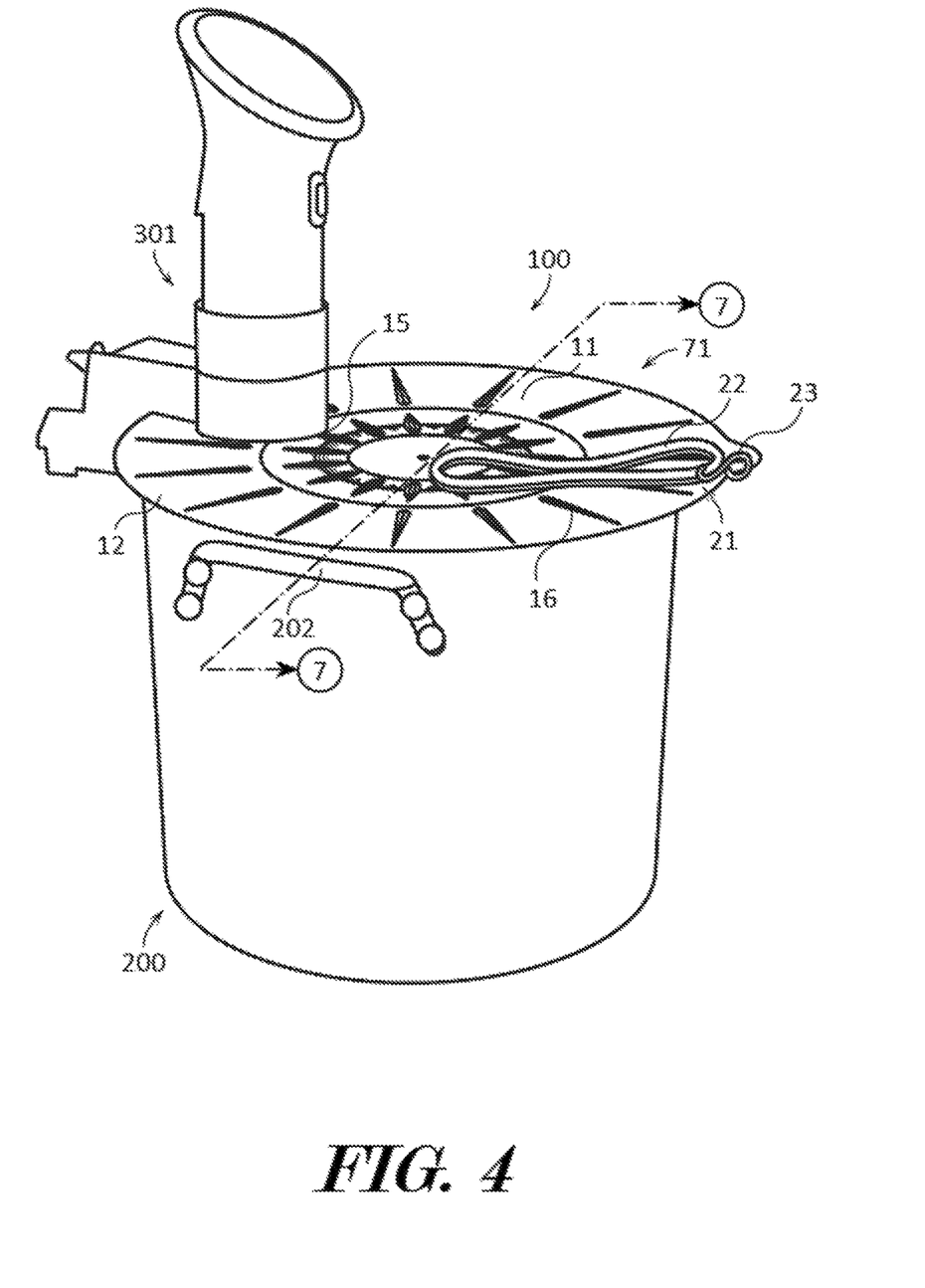
FIG. 4 depicts a perspective view of an example of a cooking vessel cover device in a closed position while engaged to a cooking vessel according to various embodiments described herein.
Figure 5:
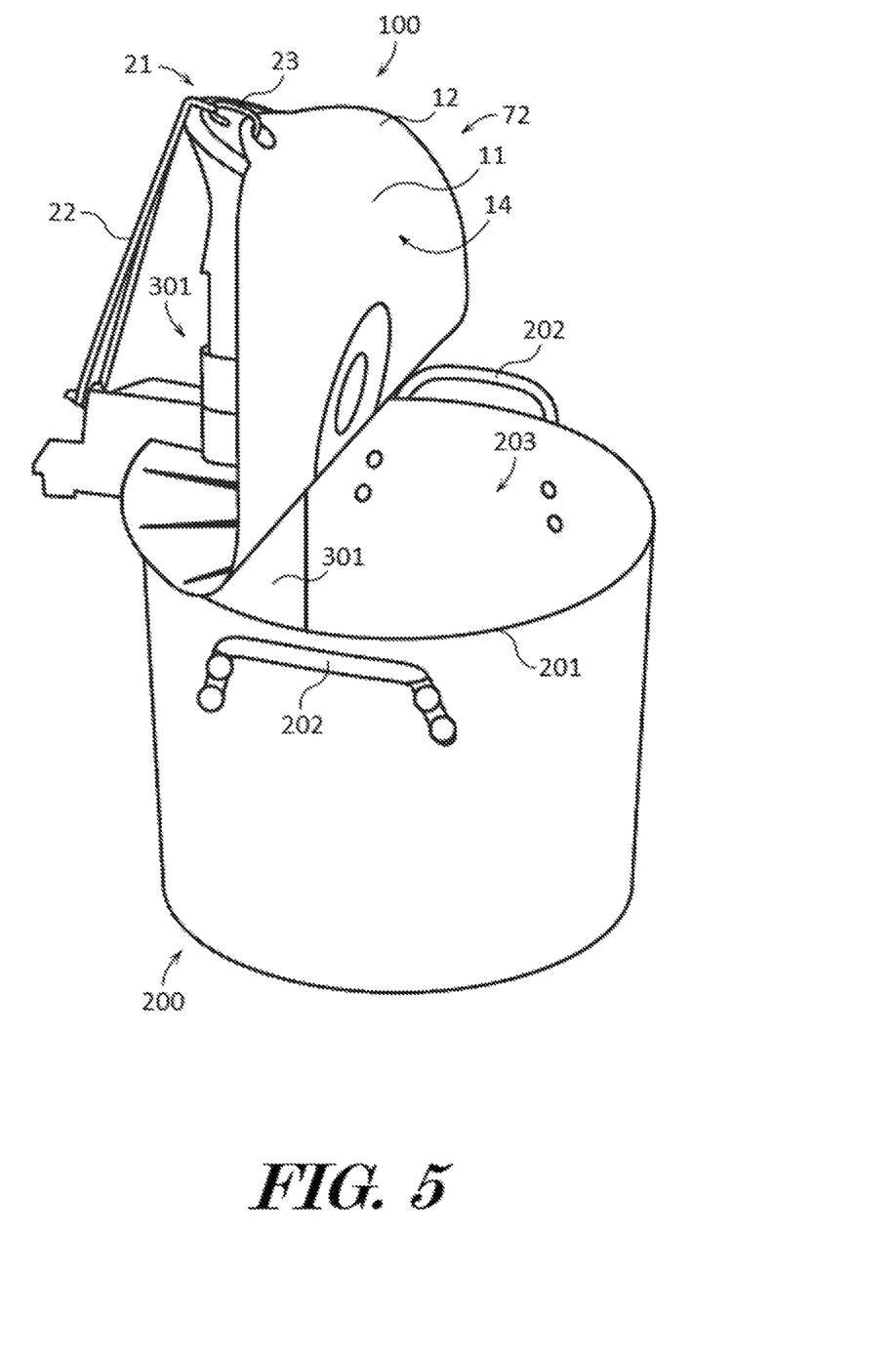
FIG. 5 illustrates a perspective view of an example of a cooking vessel cover device in an open position while engaged to a cooking vessel according to various embodiments described herein.
Figure 6:
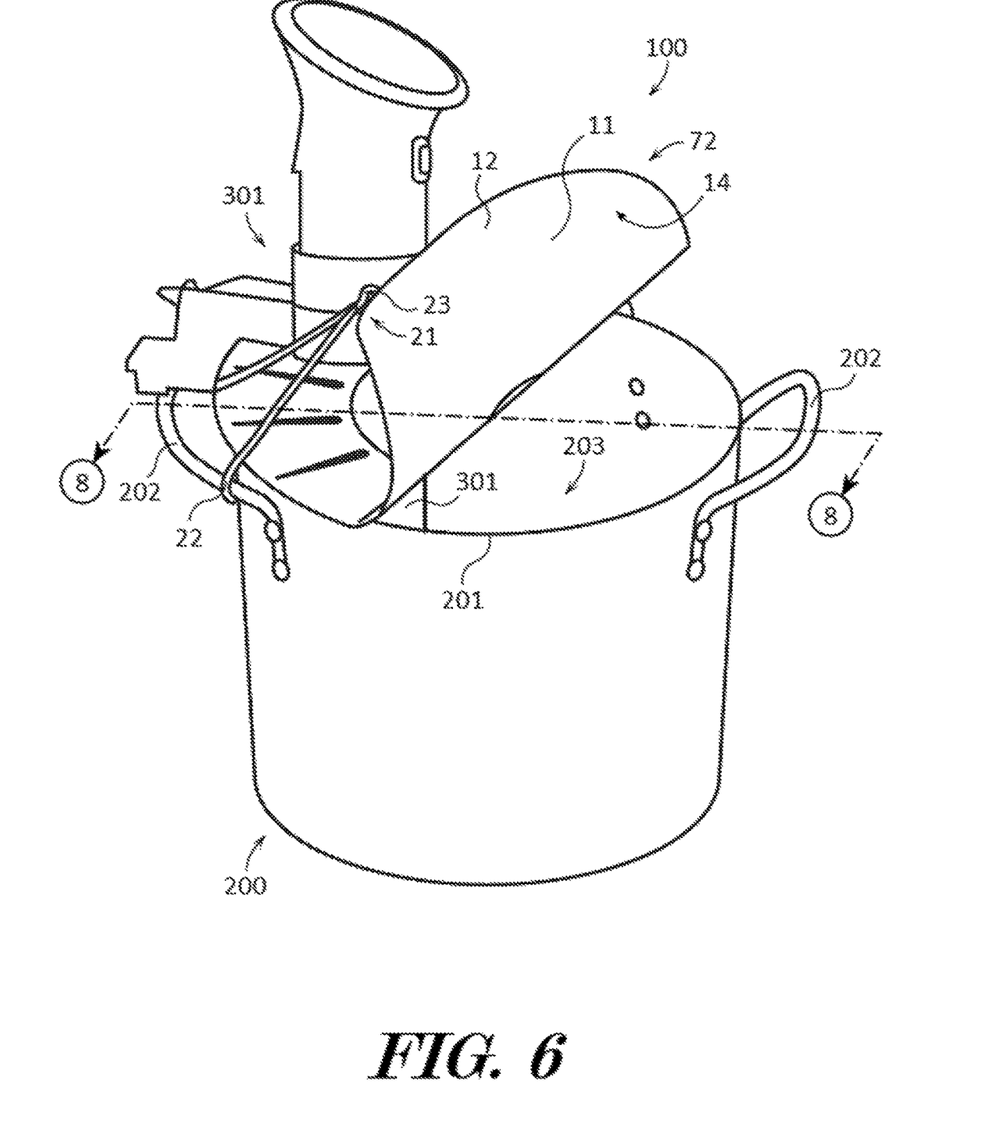
FIG. 6 shows a perspective view of another example of a cooking vessel cover device in an open position while engaged to a cooking vessel according to various embodiments described herein.

The aperture 15 may be configured to receive portions of a food preparation apparatus 301 (FIGS. 4-6) such as Sous Vide cookers and other similar cookers, Sous Vide Circulators, Sous Vide immersion Circulators, and other similar immersion circulation devices, Sous Vide Immersion Cookers, and other immersion cookers and heaters, immersion blenders and mixers, and the like, while the device 100 is in the closed position 71 and open position 72, thereby allowing the entrance of a food preparation apparatus 301 through the aperture 15 so that the body 11 can open (open position 72) and close (closed position 71) with the food preparation apparatus 301 still in place and working as shown in FIGS. 4-6. Preferably, the aperture 15 may be complementary in shape to portions of a food preparation apparatus 301 which are to be received by the aperture 15. For example, a generally circular shaped aperture 15 may receive portions of a food preparation apparatus 301, such as the shaft, which have a generally circular cross sectional area. In further preferred embodiments, the aperture 15 may be shaped slightly smaller than a portion of the food preparation apparatus 301 to be received by the aperture 15 so that when the portion of the food preparation apparatus 301 is in the aperture 15, the aperture 15 may stretch around the portion of the food preparation apparatus 301 and form a seal around the portion of the food preparation apparatus 301. In this manner, the seal formed by the relatively smaller aperture 15 around the relatively larger portion of the food preparation apparatus 301 may prevent evaporation of any water or other liquid within the interior 203 of the cooking vessel 200.

As shown in FIGS. 1 and 2, the aperture 15 may be generally circular in shape. In preferred embodiments, the aperture 15 may be shaped smaller than portions of a food preparation apparatus 301, and the body 11 or portions of the body forming the aperture 15 may be made from a flexible material so that the aperture 15 may flex to receive the food preparation apparatus 301 thereby frictionally securing and/or sealing the food preparation apparatus 301 to the device 100. In other embodiments, the aperture 15 may be shaped larger than portions of a food preparation apparatus 301. In still other embodiments, the aperture 15 may be rectangular, oval, or any other shape which may allow a food preparation apparatus 301 to be inserted through the aperture 15.

In some embodiments, a flexible material which may be used to form all or portions of the body 11 may be a natural and/or synthetic rubber or plastic material, which is flexible to allow slight deformation and resilient so as to return to its original shape after deformation. Natural rubber materials may include latex rubber, forms of the organic compound isoprene, such as polyisoprene, and the like. Synthetic rubber materials may include polysiloxane rubbers or silicone rubbers, neoprene, nitrile rubbers, fluoro-elastomers, thermoplastics, Polyacrylate Rubber, Ethylene-acrylate Rubber, Polyester Urethane, Bromo Isobutylene Isoprene, Polybutadiene, Chloro Isobutylene Isoprene, Polychloroprene, Chlorosulphonated Polyethylene, Epichlorohydrin, Ethylene Propylene, Ethylene Propylene Diene Monomer, Polyether Urethane, Perfluorocarbon Rubber, Fluoronated Hydrocarbon, Fluoro Silicone, Fluorocarbon Rubber, Hydrogenated Nitrile Butadiene, Polyisoprene, Isobutylene Isoprene Butyl, Acrylonitrile Butadiene, Polyurethane, Styrene Butadiene, Styrene Ethylene Butylene Styrene Copolymer, Polysiloxane, Vinyl Methyl Silicone, Acrylonitrile Butadiene Carboxy Monomer, Styrene Butadiene Carboxy Monomer, Thermoplastic Polyether-ester, Styrene Butadiene Block Copolymer, Styrene Butadiene Carboxy Block Copolymer, and the like. In other embodiments, a resilient material may be polytetrafluoroethylene (PTFE), polyethylene terephthalate (PET), high-density polyethylene (HDPE), polyvinyl chloride (PVC), polypropylene (PP), Polystyrene (PS), Polycarbonate (PC), low density polyethylene (LDPE), Polyoxymethylene (POM), Acrylonitrile butadiene styrene (ABS), Polyethylene/Acrylonitrile Butadiene Styrene (PE/ABS), Polycarbonate/Acrylonitrile Butadiene Styrene (PC/ABS), Ultra High Molecular Weight polyethylene, Polyurethanes (PU), Polyamides (PA), or any other suitable flexible natural or synthetic material including combinations of materials, which is flexible to allow slight deformation and resilient so as to return to its original shape after deformation.

Preferably, all or portions of the body 11 may be made from a flexible material so that the portions of the body 11 comprising a flexible material may bend to generally function as a hinge thereby allowing the device 100 to be moved between the closed position 71 (FIGS. 4 and 7) and the open position 72 (FIGS. 5, 6, and 8) by bending those portions of the body 11. In this manner, a device 100 having a body 11 which comprises a flexible material, may enable all or portions of the body 11 comprising the flexible material to be flexed into and out of the open position 72. In further embodiments, the body 11 may consist of a flexible material which enables the body 11 to be flexed into and out of the open position 72. In alternative embodiments, the body 11 may be made from or comprise generally rigid materials such as any type of hard plastic, hard rubber, ceramic, metal and metal alloys, resin, and the like. For example, the body 11 may comprise two panels, each comprising a generally rigid material, which may be coupled together with a flexible material which may bend to generally function as a hinge thereby allowing the device 100 to be moved between the closed position 71 and the open position 72 by bending those portions of the body 11 comprising the flexible material. In still further embodiments, the body 11 may comprise a hinged coupling which may function as a hinge thereby allowing the device 100 to be moved between the closed position 71 and the open position 72.

In preferred embodiments, a hinged coupling may comprise a so-called "living" hinge, which typically comprises a linear, relatively flexible area between two relatively more rigid components, such as a line of thin plastic or flexible metal between thicker or more rigid portions, as is well known in the art. In other embodiments, a hinged coupling may comprise a butt hinge, piano hinge, barrel hinge, butt/Mortise hinge, case hinge, flag hinge, strap hinge, H hinge, HL hinge, piano hinge, butterfly hinge, flush hinge, barrel hinge, concealed hinge, continuous hinge, T-hinge, strap hinge, double-acting hinge, Soss hinge, counterflap hinge, flush hinge, coach hinge, rising butt hinge, double action spring hinge, tee hinge, friction hinge, security hinge, cranked hinge or stormproof hinge, lift-off hinge, self closing or self positioning hinge, flexible material hinge, or any other type or style of hinge which may enable portions of the device 100 to be moved relative to other portions.

In the embodiments shown in FIGS. 1-6, the body 11 may comprise a generally flat planar shape with a generally circular shaped perimeter 12 and the aperture 15 may also be generally circular in shape. In further embodiments, the body 11 may comprise a generally flat planar shape with a generally rectangular shaped perimeter 12 thereby allowing the body to be used to cover rectangular cooking vessels 200 having rectangular shaped upper terminuses 201 (FIGS. 5 and 6). As perhaps best shown in FIGS. 2, 4, and 7, in preferred embodiments, the lower surface 14 of the body 11 may comprise a flat planar shape which enables the lower surface 14 to rest on the upper terminus 201 of a cooking vessel 200 so that the lower surface 14 may support the device 100 above the interior 203 of the cooking vessel 200 solely by the contact between the lower surface 14 and the upper terminus 201.

However, it should be understood to one of ordinary skill in the art that the aperture 15, and the body 11, including the perimeter 12, upper surface 13, and lower surface 14, may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

In some embodiments, the body 11 and/or perimeter 12 may comprise texturing 16 which may comprise ridges, bumps, indentations, protrusions, depressions, or any other type or shape of texturing 16. Texturing 16 may optionally be positioned on the upper surface 13 and/or lower surface 14 and may preferably facilitate the frictional engagement between the device 100 and a user and/or between the device 100 and the upper terminus 201 (FIGS. 5 and 6) of a cooking vessel 200 (FIGS. 4-6).

The device 100 may comprise a positioning fastener 21 which may be configured to be removably coupled to one or more objects thereby securing or retaining the device 100 in an open position 72 (FIGS. 5 and 6) and/or in a closed position 71 (FIG. 4) while a food preparation apparatus 301 is working and positioned through the aperture 15. In some embodiments, a positioning fastener 21 may comprise a length of flexible material 22 which may be configured as a loop and which may be coupled to the body 11 with a lid fastener 23. In other embodiments, the length of material 22 may be coupled directly to the body 11 without using a lid fastener 23.

The length of material 22 may comprise a flexible material which may be placed or looped over portions of a cooking vessel 200 (FIGS. 4-6) and/or food preparation apparatus 301 (FIGS. 4-6) to retain the device 100 in an open position 72. Preferably, a positioning fastener 21 may comprise a length of material 22 configured with a shape that is generally rounded, rectangular, triangular, or any other shape. In some embodiments, the length of material 22 may comprise a length of between two and thirty inches and preferably between four and twenty inches. In further embodiments, the length of material 22 may be configured as a loop or having an annular shape and may comprise a looped length of between two and thirty inches and preferably between four and twenty inches.

A lid fastener 23 may provide a movable coupling method of securing the length of material 22 to the body 11. In preferred embodiments, a lid fastener 23 may comprise a circular or annular ring shape and be made or of comprise a rigid material such as metal, wood, hard plastic, or the like. In alternative embodiments, a lid fastener 23 may comprise a rivet type fastener, a hinged coupling, a pivotal coupling, a removable coupling, or any other fastener or coupling method which may enable the length of material 22 of the positioning fastener 21 to be movably coupled to the body 11.

In other embodiments, a positioning fastener 21 may comprise a clip fastener, a hook and loop type or Velcro ® fastener, a clasp fastener, a ball chain and ball chain connector, a magnetic fastener, or any other suitable type of fastener which may be configured to be removably coupled to one or more objects thereby securing or retaining the device 100 in an open position 72 and/or in a closed position 71.

FIG. 4 depicts a perspective view of an example of a cooking vessel cover device 100 in a closed position 71 while engaged to a cooking vessel 200 according to various embodiments described herein. In some embodiments, the device 100 may be engaged to a cooking vessel 200 by placing portions of the body 11, such as the perimeter 12 and/or lower surface 14 in contact with the upper terminus 201 (FIGS. 5 and 6) or rim of the cooking vessel 200 with the contact maintained by the force of gravity. In other embodiments, the perimeter 12 and/or portions of the lower surface 14 (FIGS. 2, 3, 5, and 6) may be formed into a rim which may be snap fitted or press fitted to mate with the upper terminus 201 of the cooking vessel 200.

As shown in this example when in the closed position 71, portions of the body 11, such as the perimeter 12 and/or lower surface 14, may contact the upper terminus 201 (FIGS. 5 and 6) or rim of the cooking vessel 200 so that the perimeter 12 and the body 11 are in a generally flat planar orientation. Portions of a food preparation apparatus 301 may be received through the aperture 15 which may be of a complementary, and preferably smaller, shape than the portions of the food preparation apparatus 301 received through the aperture 15. In this manner, the device 100 may function as a lid or cover for the cooking vessel 200 to prevent or reduce the loss of moisture of the food or evaporation of a Sous Vide cooking medium within the interior of the cooking vessel 200 and thereby reducing the variability of the temperature within the cooking vessel 200 and the food contents of the cooking vessel 200 while allowing the food preparation apparatus 301 to operate in the cooking vessel 200. Additionally, the device 100 may function as a lid or cover for the cooking vessel 200 to prevent the contents of the cooking vessel 200 from inadvertently splattering or otherwise exiting the cooking vessel 200 while allowing the food preparation apparatus 301 to operate in the cooking vessel 200.

FIG. 5 illustrates a perspective view of an example of a cooking vessel cover device 100 in an open position 72 while engaged to a cooking vessel 200 according to various embodiments described herein in which portions of an exemplary food preparation apparatus 301 are shown received through the aperture 15 while other portions of the food preparation apparatus 301 are clamped to the cooking vessel 200. In this example, the positioning fastener 21 is looped over or otherwise secured to the portion of the food preparation apparatus 301 which is clamped to the cooking vessel 200. In this manner, the positioning fastener 21 may maintain the device 100 in an open position 72 and preferably a curved planar orientation so that the interior 203 of the cooking vessel 200 and/or the contents of the cooking vessel 200 may be accessed, added to, removed from, viewed, or otherwise manipulated while allowing the food preparation apparatus 301 to operate in the cooking vessel 200.

FIG. 6 shows a perspective view of another example of a cooking vessel cover device 100 in an open position 72 while engaged to a cooking vessel 200 according to various embodiments described herein. Portions of a food preparation apparatus 301 are shown received through the aperture 15 while other portions of the food preparation apparatus 301 are clamped to the cooking vessel 200. In this example, the positioning fastener 21 is looped over or otherwise secured to a portion of the cooking vessel 200 which may be a handle 202 coupled to a sidewall 204 of the cooking vessel 200 or other suitable structure on or proximate to the cooking vessel 200 and/or food preparation apparatus 301. In this manner, the positioning fastener 21 may also maintain the device 100 in an open position 72 and preferably a curved planar orientation so that the contents of the cooking vessel 200 may be accessed, added to, removed from, viewed, or otherwise manipulated while allowing the food preparation apparatus 301 to operate in the cooking vessel 200.

While some materials have been provided, in other embodiments, the elements that comprise the device 100 such as the body 11, perimeter 12, upper surface 13, lower surface 14, aperture 15, positioning fastener 21, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A cooking vessel cover device for use with a cooking vessel having an upper terminus, the device comprising:
    a. a body having a flexible perimeter completely and continuously surrounding the body, a flexible upper surface, and a flexible lower surface, the body uniformly constructed from a single flexible material, the body movable between an open position where the body including the flexible perimeter is bent upward into a curved planar orientation towards itself and in which only a portion of the flexible lower surface and the flexible perimeter is left in contact with a portion of the upper terminus of the cooking vessel but not the entire upper terminus of the cooking vessel, and a closed position in which the flexible lower surface is in contact with the entire upper terminus of the cooking vessel; and
    b. an aperture disposed within the body, wherein the aperture is capable of receiving and sealing to portions of a food preparation apparatus received by the aperture, and wherein the aperture passes through the flexible upper surface and flexible lower surface.

2. The device of claim 1, further comprising a positioning fastener coupled to the body.

3. The device of claim 2, wherein the positioning fastener comprises a length of flexible material.

4. The device of claim 2, wherein the positioning fastener comprises a lid fastener.

5. The device of claim 1, wherein the flexible material is selected from the group consisting of: polysiloxane rubbers, neoprene, nitrile rubbers, fluoro-elastomers, and natural rubbers.

6. The device of claim 1, wherein the lower surface is a flat planar shape.

7. The device of claim 1, wherein the aperture is circular in shape.

8. The device of claim 1, wherein the aperture is fully surrounded on all sides by the flexible perimeter.

9. The device of claim 1, wherein the aperture is fully surrounded on all sides by the flexible perimeter and portions of the body.

10. The device of claim 1, wherein the aperture is positioned off-center on the body proximate to the flexible perimeter.

11. The device of claim 3, wherein the length of flexible material of the positioning fastener terminates with a clip fastener configured to be removably coupled to one or more objects thereby securing the body in a plurality of upwardly curved open positions.

* * * * *